Jan. 9, 1968  F. E. GLASER  3,362,417
FEATHER ARTICLE FOR ADORNMENT OF THE HUMAN
EYE AND METHODS OF PRODUCING SAME
Filed March 18, 1965  3 Sheets-Sheet 1
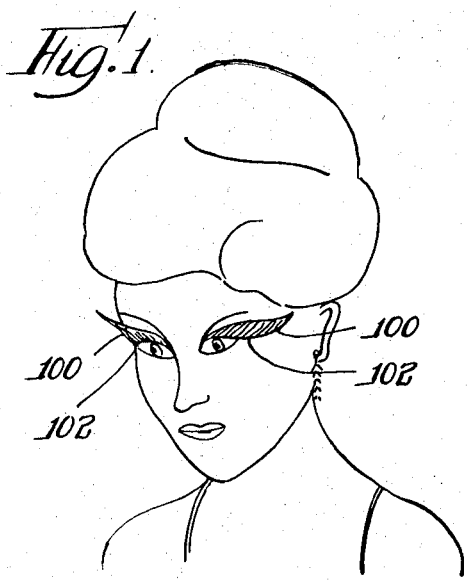
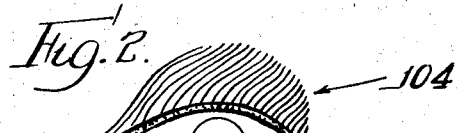
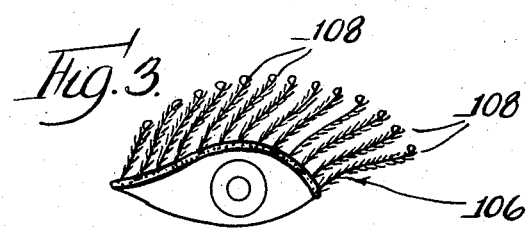
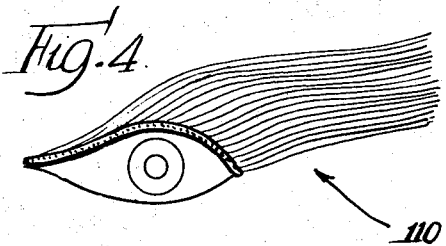
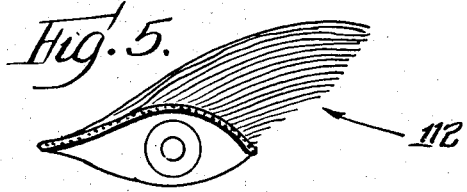
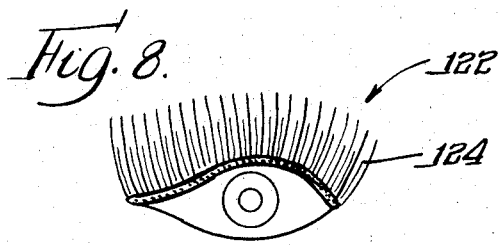
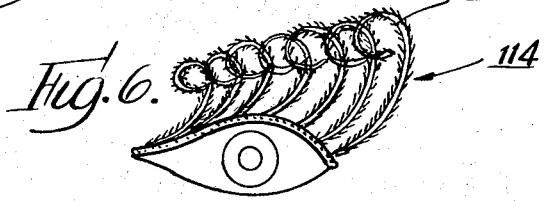
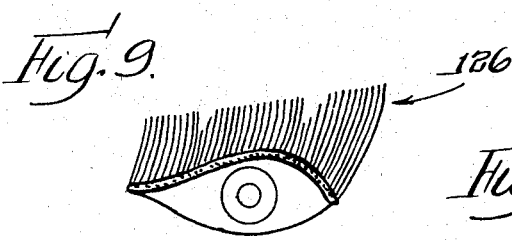
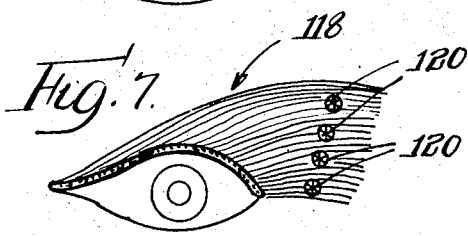
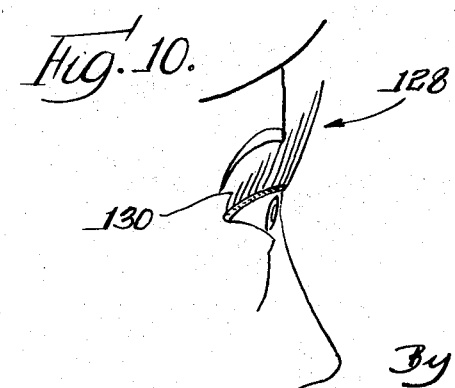
Inventor
Fredrick E. Glaser
By Wallenstein, Spangenberg,
Hattis & Strampel Atty's Jan. 9, 1968   F. E. GLASER   3,362,417
FEATHER ARTICLE FOR ADORNMENT OF THE HUMAN
EYE AND METHODS OF PRODUCING SAME
Filed March 18, 1965   3 Sheets-Sheet 2

Inventor
Fredrick E. Glaser
By: Wallenstein,
Spangenberg, Hattis
& Strampel   Attys.

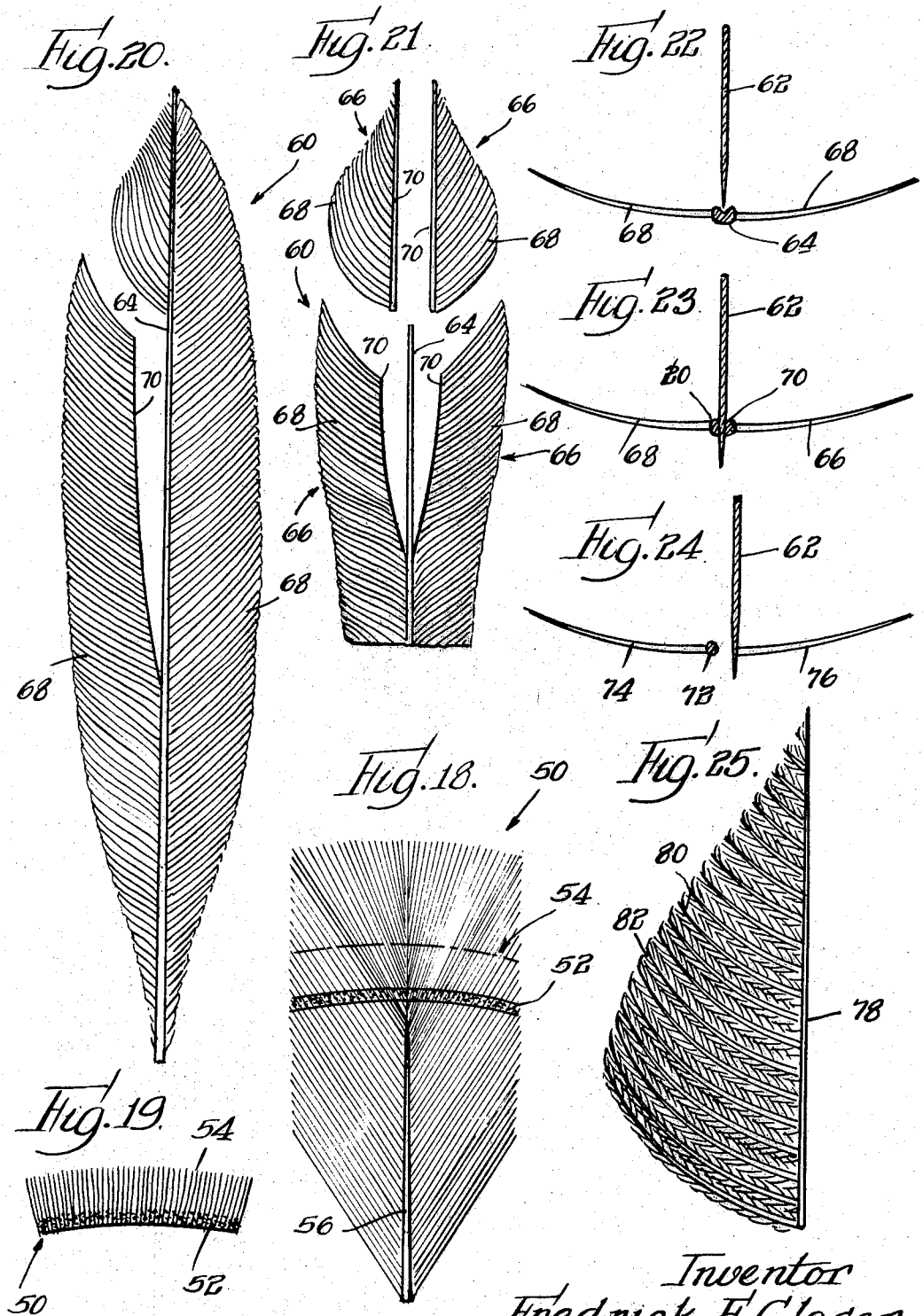

United States Patent Office 3,362,417
Patented Jan. 9, 1968

3,362,417
FEATHER ARTICLE FOR ADORNMENT OF THE HUMAN EYE AND METHODS OF PRODUCING SAME
Frederick E. Glaser, 710 Rush St., Chicago, Ill. 60611
Filed Mar. 18, 1965, Ser. No. 440,753
7 Claims. (Cl. 132—5)

ABSTRACT OF THE DISCLOSURE

An article for attachment to the human eyelid for adornment of the human eye comprising a portion of a feather, exclusive of the shaft thereof, having a length sufficient to enable it to be attached to a human eyelid and to substantially overlie the eyelashes of the eyelid, said portion consisting essentially of a plurality of naturally arranged and integrated feather barbs which are anchored at a point along their length to a relatively narrow, thin, common, flexible support base formed from a rubbery material, such as an elastomer or resin, said feather barbs having a length substantially greater than that of the natural eyelashes of the human eyelid and a configuration to enable them to substantially mask the natural eyelashes of the human eyelid. The common, flexible support base for the barbs is capable of conforming to the contours of the human eye in any position of the human eyelid, and serves to carry an adhesive material for attaching the article to the eyelid. The method of making the article involves applying a narrow, thin strip of a liquid adhesive substance across a portion of the barbs at a point near the base thereof, allowing the adhesive substance to solidify into a flexible, substantially water-insoluble, continuous band, and then separating the adhesive substance-formed band, with the feather barbs anchored therein from the remainder of the feather.

---

This application is a continuation-in-part of co-pending application Ser. No. 416,561, filed Dec. 7, 1964 and now abandoned.

This invention relates to articles for adornment of the human eye and to methods of producing such articles. In particular, the present invention relates to articles for adornment of the human eye formed from feathers and to methods of producing such articles from feathers.

The application of beauty aids to various areas adjacent the human eye has long been recognized as an important adjunct to the overall attractive appearance of a woman. One such aid in common use is the so called artificial eyelash. Generally speaking, the objective sought in applying artificial eyelashes to the eyelid of the human eye is simply an exaggeration of the length and curvature of the natural eyelashes of the wearer. The coloring of each of the hair-like elements of a conventional set of artificial eyelashes is the same throughout and usually is darker than the color of the natural eyelashes of the wearer. These characteristics of conventional eyelashes impart a certain sameness to the eyes of women wearing them and, except in those few instances where the eyes of the wearer have unusual natural beauty, often fall short of giving the wearer the distinctively attractive appearance desired.

In accordance with the present invention, articles for adornment of the human eye are provided which enable the wearer to achieve effects not possible with conventional artificial eyelashes. Furthermore, from the standpoint of variability in coloring and size of the articles of this invention, the effects attainable are almost limitless and reduce to chance or accident the possibility of one wearer, in any given group, having the same, or even a similar, article adorning her eyes as any other member of the group.

The objectives of the present invention are achieved by fabricating the articles from feathers or feather-like bodies in accordance with techniques thereafter described in detail. The coloring, lightweight, and the integrated, high-strength characteristics of natural feathers make them particularly suitable for the purposes of this invention and, therefore, are especially preferred as a starting material. Artificial feathers, as well as feather-like bodies cast or molded from plastic, or the like, also can be utilized, but, from an esthetic standpoint, rank below natural feathers as base materials for producing the articles of this invention.

Natural feathers, while differing in color, size, and shape, have certain structural characteristics in common. Thus, they generally consist of a rounded stem, or shaft, having a plurality of projections or barbs extending outwardly from both sides thereof. The distal part of the shaft is referred to as the rachis. The proximal part, or base, of the shaft is called the quill. Intermediate the rachis and the quill, the feather may have an aftershaft, or side branch. The aftershaft resembles a small feather springing from the main shaft at the proximal end of the rachis. The barbs of the feather, in most instances, bear minute processes on each side which are called barbules. The barbules may, in turn, have small processes referred to as barbicels. To complete the structure, those barbicels which grow on the barbules directed toward the outer end of the feather frequently have small hook-like bodies, called hamuli, which attach themselves to the barbules of adjacent barbs thereby uniting the whole series of processes into a vane-like or web-like structure.

The articles of the present invention, broadly, comprise a plurality of feather barbs arranged in side by side relation with their lower ends anchored or secured in one side of a common flexible support base. In accordance with the especially preferred aspects of this invention, the naturally-formed integrated, web-like arrangement of the barbs of a feather advantageously is preserved and exploited in fabricating the eye adornment articles, and the common base for the barbs is formed from a liquid elastomer or resin. In accordance with another aspect of the present invention, the articles comprise a plurality of feather barbs arranged as indicated having a common base constituted of a portion of the shaft of the feather. The majority of the barbs in the embodiments of the articles of this invention desirably have a length substantially greater than that of the eyelashes of the eyelid and a shape or configuration which enables them to substantially mask the lashes of the eyelid to give the wearer a distinctively attractive appearance not attainable with conventional artificial eyelashes.

Feathers from virtually any type of bird, including domestic fowl, can be utilized for the purposes of this invention. Particularly beautiful and exotic effects are attained, for example, with the feathers of peacocks, pheasants and ostriches. The plumage of various tropical birds offers almost unlimited sources of materials for the articles of the present invention. The feathers of domestic birds such as chickens, ducks and turkeys also can be used to advantage. Generally speaking, the feathers utilized in fabricating the articles will possess color characteristics which will impart a natural beauty to the articles defying duplication by conventional dyeing techniques. In the case of articles formed from ostrich plumes or chicken feathers, dyes may be used to produce articles having hues not normally found in natural feathers.

Referring, now, to the drawings, in which, among other things, illustrative, but particularly preferred, embodiments of the present invention are shown, FIG. 1 is a view in perspective of the head of a model with a pair of articles, fabricated in accordance with the practices of the present invention, mounted on her eyelids;

FIGS. 2 through 9, inclusive, are front views in elevation showing various embodiments of articles of the present invention mounted on an eyelid;

FIG. 10 is a fragmentary side view in elevation of the head of a model with still another embodiment of the present invention mounted on her eyelid;

Figure 11:
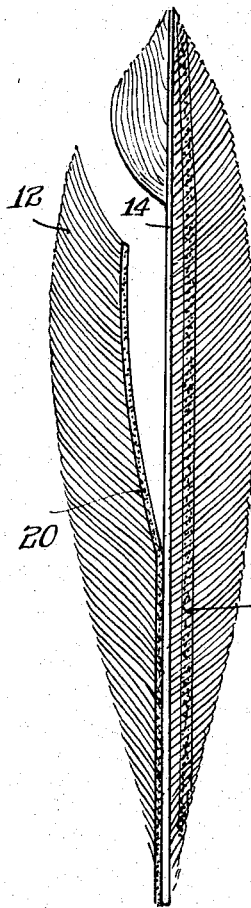
FIGS. 11 and 12 are top plan views illustrating methods of fabricating the articles of the present invention from a feather.
Figure 12:
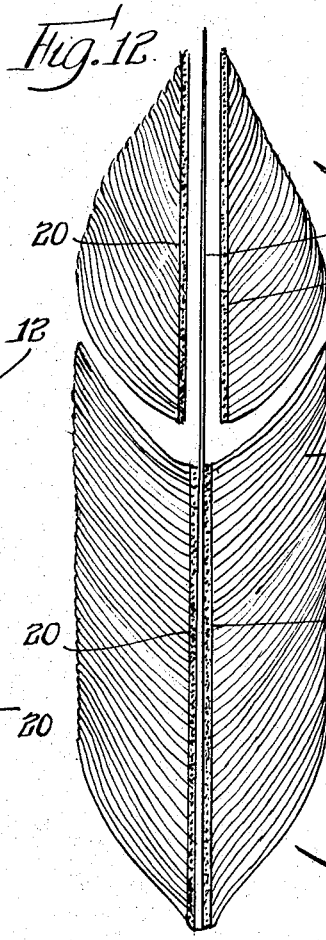
Figure 13:
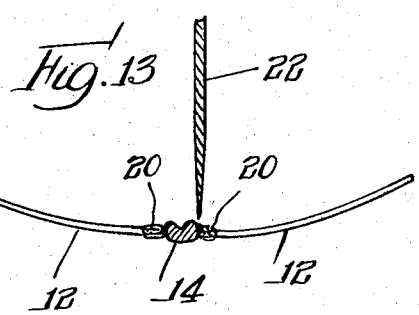
Figure 14:
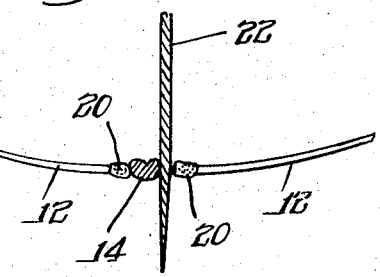
Figure 15:
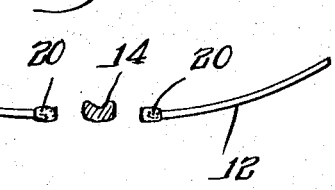
Figures 16, 17:
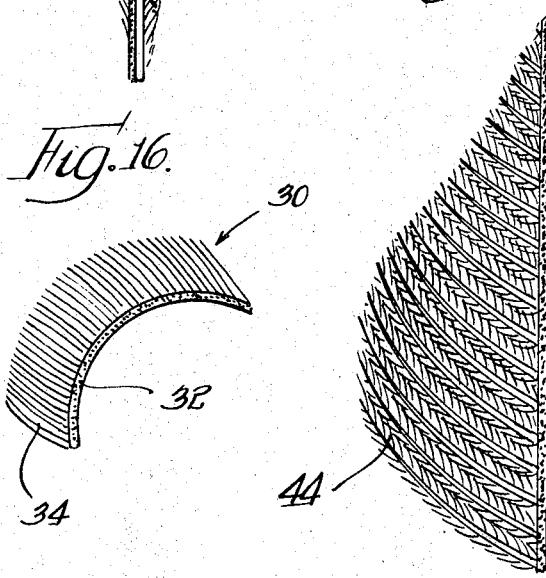

FIGS. 13 through 15, inclusive, are enlarged vertical sectional views illustrating a method of separating the shaft of a feather from the anchored barbs in forming the articles of the present invention;

FIG. 16 is a view in perspective illustrating an embodiment of an article formed in accordance with one of the methods of this invention from a small feather;

FIG. 17 is an enlarged top plan view illustrating a method of forming an article of the present invention from a portion of a feather;

FIGS. 18 and 19 are top plan views illustrating still another embodiment of an article fabricated from a feather in accordance with the practices of the present invention;

FIGS. 20 and 21 are views corresponding to the views of FIGS. 11 and 12 illustrating still another method of fabricating the eye adornment articles of this invention from feathers;

FIGS. 22 through 24, inclusive, are enlarged views corresponding to the views of FIGS. 13 through 15, inclusive, showing various methods of forming the articles of this invention; and FIG. 25 is an enlarged top plan view of an article of this invention formed in accordance with the methods illustrated in FIGS. 20 through 24, inclusive.

Referring, now, more particularly to FIGS. 11 and 12 of the drawings, there is shown a feather 10 comprised of a plurality of barbs 12 extending outwardly from each side of a shaft 14. In accordance with an especially preferred practice of the present invention, a number of matching eye adornment articles can be made from a feather such as feather 10 by applying a narrow strip or band 20 of a liquid elastomer or resin along the sides of the shaft 14 thereof for substantially the entire length of the feather. The strips or bands 20 of the elastomer or resin need only be applied to one face of the feather and may be positioned directly adjacent each side of the shaft 14 of the feather, as shown on the left in FIG. 11 and in FIGS. 12 through 15, inclusive, or they may be positioned in spaced relation to the sides of the shaft 14, as illustrated on the right in FIG. 11. To avoid any appreciable increase in the weight of the articles, and so as not to detract from their appearance, the elastomer or resin desirably should not be applied too heavily and the bands 20 should not be too wide. Excellent effects are achieved with bands of the elastomer or resin having a thickness of the order of about $1/32$ to about $1/16$ inch, more or less, and a width of about $1/16$ to $1/4$ inch, usually about $1/8$ to $3/16$ inch. By properly controlling or metering the amount of the elastomer or resin applied, the bands can be formed with a single application of the elastomer or resin.

The bands 20 may be formed on the feather 10 by any of various known techniques. Exemplary of such techniques are brushing, spraying, roller coating, or continuous gravity-flow or applied pressure-flow application. After the elastomer or resin has been applied to the feather, it advantageously is dried or cured, whichever the case may be, in any manner known in the art. Following drying or curing of the elastomer or resin, the bands 20, with the barbs 12 anchored or secured therein, are separated from the shaft 14 of the feather. This conveniently may be accomplished by utilizing a cutting edge 22, as illustrated in FIGS. 13 and 14. The bands, together with the barbs, are then cut into suitable lengths to form the eye adornment articles. Generally speaking, while no additional trimming of either the bands or the barbs is necessary, the barbs may be formed into any shape desired by this means. Also, interesting and exotic effects can be attained by fabricating the articles of this invention from portions of elastomer or resin held barbs obtained from two or more differently colored and/or shaped feathers, by adhering the portions together end to end.

In FIGS. 16 and 17 there are illustrated eye adornment articles fabricated in accordance with the practice of the invention above described. The article 30, shown in FIG. 16, comprises a flexible base 32, formed of a portion of the band 20, having anchored therein a plurality of feather barbs 34 of substantially the same length constituted of the barbs 12 of the feather 10 located substantially centrally of the ends of the feather 10. The article 30 has a curvature which is normally present in forming the articles with the band 20 as described. The article 40, illustrated in FIG. 17, is formed from the barbs located at the tip of the feather 10, and comprises a flexible base 42, formed from a portion of the band 20, and barbs 44 of varying length.

Still another method of forming articles of this invention is illustrated in FIGS. 18 and 19 of the drawing. In accordance with the practice of the invention there shown, a feather 50, having a rounded tip, is employed as a starting material. Typical of feathers having such a shape are those obtained from peacocks and turkeys. In fabricating articles from such a feather, a narrow strip or band 52 of the elastomer or resin is applied across the bars 54 in transverse relation to the shaft 56. As before, after drying or curing the elastomer or resin, the band 52, together with the barbs 54 anchored therein, are removed from the remainder of the feather to provide a ready-to-use article such as that illustrated in FIG. 9. The barbs 54 may be trimmed to any length desired and may have a curvature impressed upon them by simply drawing them across the edge of a knife blade or a cutting edge of a pair of scissors.

The elastomers or resins having utility for the purposes of this invention advantageously should, when solidified, be substantially water-insoluble, flexible or pliable, and have moderate to low elongation characteristics. While the present invention contemplates the use of pressure-sensitive adhesive materials to form the band or common base for the feather barbs, it is preferred particularly from a handling and packaging standpoint, to utilize elastomeric or resinous materials which provide a band or base having a dry, non-tacky surface. Although the band or common base of the eye adornment articles of this invention, when attached to the eyelid of a wearer, will have minimal or no contact with the skin tissue of the eyelid, it is further desirable that the elastomeric or resinous materials employed be compatible with skin tissue. In view of the fact that the band or common base is, for all practical purposes, hidden when the eye adornment articles are being worn, the color of the elastomeric or resinous material used is not important. However, commercial considerations dictate the use of elastomers or resins which provide a clear, or light colored, band or common base for the articles.

The elastomers or resins employed in the practice of the present invention to attain the desired result may be selected from a wide group which includes water-based and solvent-based adhesives, as well as hot-melt adhesives. The water-based and solvent-based adhesives may be used in the form of water- or organic-solvent solutions or dispersions or emulsions. Exemplary of water-based adhesives that can be used are water solutions or dispersions of methylcellulose and polyvinyl alcohol; natural or synthetic rubber latices made by emulsion polymerization including those made from natural rubber, butyl rubber, SBR rubber, styrenebutadiene, nitrile and chloroprene synthetic rubbers; urea-formaldehyde and phenol-formaldehyde resins; and vinyl acetate, acrylic, methacrylic, vinyl chloride, vinylidene chloride and styrene emulsion polymer and copolymer synthetic resins. Solvent-based adhesives that can be employed include solvent solutions of the previously referred to natural and synthetic rubbers, and synthetic resins, in addition to polyvinyl ethers, polyamide, polyisobutylene, cyclized rubber, nitrocellulose, polyurethanes, and epoxies. Hot-melt adhesives having utility in the invention includes petroleum waxes, high molecular weight polymers such as ethyl cellulose, cellulose acetate butyrate, and polyvinyl acetate. The foregoing adhesives, of course, may be modified by the inclusion of other ingredients to provide a band or flexible base for the articles of the present invention having the desired characteristics. Excellent results can be attained with an adhesive of the type described sold under the trade name "DUO" Surgical Adhesive (Johnson & Johnson).

Referring again to the drawings, and in particular to FIGS. 20 through 25, inclusive, still another method of fabricating the eye adornment articles of the present invention is shown. In accordance with the practice of the invention there illustrated, a feather 60 is scored or cut with a knife or razor blade 62 along its shaft 64 to provide matching portions 66—66 each having barbs 68—68 naturally integrally secured in flexible suporting bases 70—70 constituted of a portion of the shaft 64. The bases 70—70 of the portions 66—66 desirably should have a length sufficient to enable articles formed from the portions 66—66 to be attached to the eyelid of a wearer, and should, in addition, be sufficiently pliable to permit the articles generally to conform to the curvature impressed on the eyelid by the eye. In those instances where the stiffness of the bases 70—70 is too great after removal from the shaft 64, treatment with chemicals or hot water, for example, may be resorted to for the purpose of imparting the desired pliability to the bases. As with the previously discussed embodiments of the invention, interesting and exotic effects can be achieved by fabricating the articles from portions, of lesser length than the portions 66—66, obtained from two or more differently colored and/or shaped feathers, and adhering them together end to end.

In forming articles from a feather having a shaft of small cross-section by this practice of the invention, the shaft may be cut directly down its median or center line, as illustrated in FIGS. 22 and 23. In forming the articles of this invention from the distal end or rachis of the shaft, or from a single, small feather having a very thin shaft, matching or mating articles are best fabricated by removing, as by mutting, the barbs completely from one side of the shaft or rachis of one feather, and then performing a similar operation on a second feather of similar coloring and configuration. This technique is illustrated in FIG. 24. As there shown, the thin shaft, or rachis 72, whichever is the case, forms the base of one article and has barbs 74 secured to one side only thereof. The barbs 76 on the opposite side have been removed. FIG. 25 is an enlarged representation of an embodiment of an article fabricated from a single, small feather, or the distal end of a larger feather, by removal of the barbs completely from one side of the shaft. The base 78 of such an article is very pliable and readily can be made to conform to the curvature of the eyelid. The barbs 80, and their barbules 82, form an integrated network or web which is highly resilient and long-lasting. The weight of the articles, whether formed from a single feather or a portion of a large feather, is almost negligible and, as a result, the articles, even though much larger from the standpoint of overall area than conventional artificial eyelashes, are just as comfortable to wear.

The eye adornment articles of the present invention can be attached to the eyelid in any of various ways. To this end, a small quantity of a liquid adhesive material of the type commonly used in connection with ordinary artificial eyelashes can be applied by the user to one side of the support base of the articles and the article can then be secured in proper position on the eyelid. Alternatively, a narrow strip of a pressure-sensitive adhesive tape such as topee tape can be secured to the support base and the article then can be attached to the eyelid by means of the tape. As indicated hereinabove, in the embodiments of the invention wherein the shaft is not used as the support base, the support base can be made of a band of pressure-sensitive adhesive which would enable the articles to be attached to the eyelid directly, thereby eliminating the need for auxiliary adhesives or adhesive carrying materials.

The striking effects attainable with the articles of adornment of the present invention are clearly illustrated in FIGS. 1 through 10, inclusive. As can be seen from these figures, the articles of this invention tend to substantially mask the natural eyelashes of the wearer thereby providing an eye adornment which is not only markedly beautiful but distinctively individualistic. Colors and configurations can be selected at will to complement both the facial characteristics of the wearer as well as her clothes.

Referring, now, in particular to FIGS. 1 through 10, FIG. 1 shows a model having articles 100—100, fabricated in accordance with the practice of this invention, attached to her eyelids 102—102. FIG. 2 illustrates an embodiment of an article 104 of this invention fabricated from a duck feather. FIG. 3 is an embodiment of an article 106 of this invention made from an ostrich feather. As shown, glitter 108, or shiny bits of metal foil, are adhered to the barbs as an accenting feature. FIG. 4 is an illustration of an embodiment of an article 110 made from a peacock plume, while FIG. 5 shows an article 112 fabricated from the end of a turkey feather. FIG. 6 is an illustration of another embodiment of an article 114 formed from an ostrich plume. The ends of the barbs 116 in this instance have had a curvature impressed on them to give the effect shown. FIG. 7 shows an article 118 formed from a peacock feather with rhinestones 120 attached thereto to provide an added glamorous effect. FIG. 8 shows another form of an embodiment of an article 122 made from a duck feather. The effect illustrated has been attained by trimming and separating the barbs 124 of the duck feather. FIG. 9 illustrates an embodiment of an article 126 formed from a chicken feather which has been trimmed and dyed. FIG. 10 is a profile representation of an embodiment of an article 128 of this invention, fabricated from an ostrich feather, and attached to the eyelid 130 of a wearer. The eyelash-masking effect attained with the unique articles of this invention is clear from this view as well as that of FIG. 1. The embodiments of the articles of the invention shown in the drawings are presented by way of illustration and are not to be construed as limitative of the scope of the invention. It will be understood by those skilled in the art that the articles of this invention can be fabricated in a wide variety of colors, sizes and configurations without deviating from the spirit and scope of the present invention.

What is claimed is:

1. An article for attachment to the human eyelid for adornment of the human eye comprising a portion of a feather, exclusive of the shaft thereof, said portion having a length sufficient to enable it to be attached to a human eyelid and to substantially overlie the eyelashes of the eyelid, said portion consisting essentially of a plurality of naturally arranged and integrated feather barbs, said barbs being anchored at a point along their length to a narrow, thin, common, flexible support base formed from a rubbery material and having a length substantially greater than that of the natural eyelashes of the eyelid and a configuration to enable them to substantially mask the natural eyelashes of the eyelid, said common base being capable of conforming to the contours of the eye in any position of the eyelid and serving to carry an adhesive material for attaching the article to the eyelid and having a length sufficient to enable the article to be attached to a human eyelid.

2. An article for attachment to the human eyelid for adornment of the human eye comprising a portion of a feather, exclusive of the shaft thereof, having a length sufficient to enable it to be attached to a human eyelid and to substantially overlie the eyelashes of the eyelid, said portion consisting essentially of a plurality of naturally arranged and integrated feather barbs, said barbs being anchored at their base in a thin, narrow, flexible common support band formed of a substantially water-insoluble rubbery adhesive substance, the majority of said barbs having a length substantially greater than that of the natural eyelashes of the human eyelid and a configuration to enable them to substantially mask the natural eyelashes of the eyelid, said common support band serving to carry an adhesive material for attaching the article to the eyelid and having a length sufficient to enable the article to be attached to a human eyelid.

3. An article for attachment to the human eyelid for adornment of the human eye comprising a portion of a feather exclusive of the shaft thereof, said portion consisting essentially of a web-like body of naturally arranged and integrated feather barbs and attendant processes, the barbs being anchored at their base in a flexible, common support strip of substantially the same length as said portion of the feather, the strip being formed of a substantially water-insoluble rubbery adhesive substance selected from the group consisting of natural and synthetic rubbers, resins, and mixtures thereof, said strip having a width of about $1/16$ inch to about $1/4$ inch and a thickness of about $1/32$ inch to about $1/16$ inch, said strip being capable of conforming to the contours of the eye in any position of the human eyelid and serving to carry an adhesive material for attaching the article to the eyelid, the majority of said barbs having a length substantially greater than that of the natural eyelashes of the eyelid and a configuration to enable them to substantially mask the natural eyelashes of the eyelid.

4. A method of producing an article for adornment of the human eye comprising applying a narrow strip of a liquid adhesive substance across a portion of the barbs of a feather at a point proximal to the base of the barbs, said adhesive substance being capable when solidified on the barbs of forming a flexible, substantially water-insoluble, continuous band, solidifying the adhesive substance, and separating the adhesive substance formed band with the feather barbs anchored therein from the remainder of the feather.

5. A method of producing an article for adornment of the human eye comprising placing on a supporting surface a feather having a shaft and barbs extending outwardly from both sides of the shaft, applying a narrow strip of a liquid adhesive substance across the barbs of the feather on each side of the shaft of the feather, each of said strips extending substantially the entire length of the feather proximal to the shaft of the feather, said adhesive substance being capable when solidified on the barbs of forming a flexible, substantially water-insoluble, continuous band, solidifying the adhesive substance, separating the adhesive substance formed bands with the feather barbs anchored therein from the shaft of the feather, and cutting the separated bands with the barbs anchored therein into lengths sufficient to enable the eye adornment articles thus formed to be attached to an eyelid.

6. A method as claimed in claim 5 wherein the band formed by the liquid adhesive substance has a width of about $1/16$ inch to about $1/4$ inch and a thickness of about $1/32$ inch to about $1/16$ inch.

7. A method as claimed in claim 5 wherein the liquid adhesive substance contains as the flexible band forming material an adhesive agent selected from the group consisting of natural and synthetic rubbers, resins, and mixtures thereof.

References Cited

UNITED STATES PATENTS

| 2,421,432 | 6/1947 | Phillips | 132—5 |
| 2,862,509 | 12/1958 | Porte | 132—53 |

FOREIGN PATENTS

| 21,418 | 1905 | Great Britain. |

L. W. TRAPP, *Primary Examiner.*